United States Patent [19]

Botsolas et al.

[11] Patent Number: 5,030,504

[45] Date of Patent: Jul. 9, 1991

[54] POLY(VINYL CHLORIDE)-ALUMINUM LAMINATE INSULATION AND METHOD OF PRODUCTION

[75] Inventors: Chris J. Botsolas, St. Petersburg; Robert E. Mahoney, Bradenton, both of Fla.

[73] Assignee: Carol Botsolas, Clearwater, Fla.

[21] Appl. No.: 394,943

[22] Filed: Aug. 17, 1989

[51] Int. Cl.$^5$ .................. B32B 15/08; B05D 3/12
[52] U.S. Cl. ........................ 428/215; 427/365; 427/409; 428/220; 428/421; 428/463; 428/906
[58] Field of Search ............ 428/40, 98, 461, 215, 428/906, 220, 463, 421; 220/461; 215/258; 427/409, 365

[56] References Cited

U.S. PATENT DOCUMENTS

| | | | |
|---|---|---|---|
| 3,593,848 | 7/1971 | Landau | 428/98 |
| 3,606,958 | 9/1971 | Coffman | 220/461 |
| 4,220,681 | 9/1980 | Narita | 428/463 X |
| 4,241,121 | 12/1980 | O'Connor | 428/463 X |
| 4,273,815 | 6/1981 | Gifford et al. | 428/520 X |
| 4,318,953 | 3/1982 | Smith | 428/207 X |
| 4,449,014 | 5/1984 | Brezinsky | 428/461 X |
| 4,531,991 | 7/1985 | Ziemek et al. | 156/79 |
| 4,573,601 | 6/1987 | Lamping et al. | 215/258 X |
| 4,778,700 | 10/1988 | Pereira | 428/40 |

OTHER PUBLICATIONS

Steve Elonka, Power, Mar. 1964, pp. 1-24.

Primary Examiner—Thomas J. Herbert
Attorney, Agent, or Firm—Hedman, Gibson, Costigan & Hoare

[57] ABSTRACT

A laminate insulating jacketing material having a layer of poly(vinyl chloride) bonded to a layer of aluminum foil having superior insulation jacketing properties, to be applied over pipe, tank or equipment insulation.

35 Claims, 3 Drawing Sheets

POLY(VINYL CHLORIDE)-ALUMINUM LAMINATE INSULATION AND METHOD OF PRODUCTION

FIELD OF THE INVENTION

This invention relates to insulation jacketing and to the method of producing the insulation. Specifically, this invention relates to a laminate of PVC (poly vinyl chloride) and aluminum used for insulation jacketing and the method of production.

BACKGROUND OF THE INVENTION

Laminating two or more products together has long been used to form various insulating jacketing materials. Early efforts at producing such laminations consisted of adhering a fabric over a cement coating. Since then, various jacketing techniques have been developed which include a variety of insulating materials, such as fiberglass covered with 0.006" to 0.020" thick aluminum, flexible or rigid plastic, or vapor barrier paper jackets.

The plastic employed for such insulation jacketing materials has generally been formed of commercial grade rigid PVC. Rigid PVC has been selected because of good fabrication characteristics combined with its excellent chemical, vapor barrier and water proofing properties. Typically, the rigid PVC used in plastic insulation materials has a specific gravity of approximately 1.44.

Aluminum is the most abundant metal in the world. It is an ubiquitous material widely used in applications requiring light weight strength and also in applications having difficult conformational fabrication problems. The unusual combination of light weight and strength makes aluminum applicable for many uses that other metals cannot fill. Aluminum also has high ductility at elevated temperatures. Some aluminum alloys resist corrosion very well. Additionally, the strength and ductility of aluminum increase at subzero temperatures which is the opposite of iron and steel. Aluminum also offers excellent vapor barrier properties at thicknesses of as low as 0.0003".

SUMMARY OF THE INVENTION

It is an object of the present invention to provide a laminate material of rigid PVC or other suitable plastics and aluminum or other metallic foils having insulation jacketing characteristics not able to be achieved heretofore.

It is another object of the present invention to provide a laminate material of PVC and aluminum that can be supplied as a continuous wound roll having superior mechanical and environmental properties.

It is still another object of the present invention to provide a laminate material of PVC and aluminum sheets having enhanced insulation jacketing and formability properties.

It is still a further object of the present invention to provide a method of producing a laminate of rigid PVC and aluminum, or other combinations of rigid plastic and metal foils.

Thus, a process has been created for producing a rigid plastic-metallic foil laminate which has superior mechanical, environmental, insulation properties, reduced initial cost and less expensive to install, that the present methods being used to jacket pipe and equipment insulation.

Further applications of this invention is to disclose much less expensive methods of manufacturing by combining many operations into one production line.

It is another object to provide a laminate than can be used in metal punching, drawing, or as a further laminate onto metals that can give you, at much less cost, desirable features of any type of metallic foil on one or both sides of an inexpensive substrate.

This invention will also permit the use of thicker plastic materials used in public buildings and other areas where materials are required to pass ASTM E-84 flame spread (25) and smoke development (50) requirements. At the present time, the metallic foil outside facing the rigid PVC plastics pass the (25)/(50) requirements up to a maximum of about 0.020" to 0.028" thick. Anything thicker does not pass. The metallic foil on the outside stops the flame spread allowing only the very edge of the plastic laminate to burn, and thereby greatly reduce the smoke development.

Another application of this invention is as a electrical stray current shielding material that can be thermoformed into computer housing shapes or folded and shaped into place and electrically grounded. Thermoformed types would utilize super plasticity and zinc/aluminum or aluminum/copper/zinc foils can be thermoformed at 392° F. Rigid PVC formulations are extruded at close to these temperatures and therefore compatible as a composite for shallow draft cold drawing or heated deep draw thermoforming.

Another application would be as a substitute for aluminum siding where an inexpensive grade of rigid PVC or recycled PVC or other plastic can be fused under the aluminum to reduce cost, greatly improve dent resistance, and protect the backside of the aluminum from moisture attack. Gutters and flashing roof materials can also be formed by this method by utilizing the proper PVC or plastic formulation for the application. The aluminum would protect the PVC or plastic recycle material and the plastic backing will reduce material and labor installation costs, due to it's ease in cutting and forming.

First, a PVC formulation must be developed for the application intended. If the application is for outdoor pipe and equipment insulation, with the aluminum surface facing to the weather side, then any rigid plastic fused to 0.001" to 0.010" thick aluminum or other metallic foil such as stainless steel, copper, zinc, galvanized iron, etc. can be used. In the pipe insulation industry the preferred jacketing would be aluminum outside and rigid PVC inside, as a substitute for the most commonly used product being 0.016" thick aluminum with a paper thin (approximately 0.0005" to 0.002" thick) paper, polyethylene or similar type moisture backing glued to the backside of the 0.016" thick aluminum. The rigid PVC/aluminum combination we find best would be 0.001" to 0.010" thick aluminum foil fused to 0.005" to 0.040" thick rigid virgin or recycled PVC. The optimum competitive material being 0.002" thick aluminum foil fused to 0.018" thick PVC as a total thickness of 0.020" thick in competition against 0.016" aluminum jacketing.

In a continuous process, the modified rigid PVC is then melted and pressure fed through an extruder to a slotted die at temperatures in the range of 365° F. The extrusion is fed to a three roller cooling and sizing assembly where aluminum foil is bonded to the plastic surface. The composite laminate material is thus formed possessing unique and surprising characteristics.

BRIEF DESCRIPTION OF THE DRAWINGS

The invention will be better understood when viewed with the following drawings wherein.

DESCRIPTION OF THE PREFERRED EMBODIMENT

The present invention has application anywhere that an insulation jacketing material is required having superior chemical, mechanical and environmental properties.

Thus, the invention will be described in detail in the formation of a sheet of the composite laminate material.

The PVC composition is formed in any suitable mixing or blending apparatus. Practice has shown that a high intensity mixer such as a Henschel mixer 2 is well suited for the application.

PVC resin and dibutyl tin bis iso octyl thioglycolate are first charged to the mixer 2 and heated to a temperature in the range of 165° F. Next, an impact modifier is added to the dispersion in the mixer 2 and the temperature further elevated, e.g. to about 185° F. Thereafter, calcium stearate and parafin wax are added to the dispersion in the mixer 2 and the temperature again increased, e.g. to about 200° F.

The dispersion is then dropped into a cooling blender 3 which is cooled to about 120° F.

Figure 1:
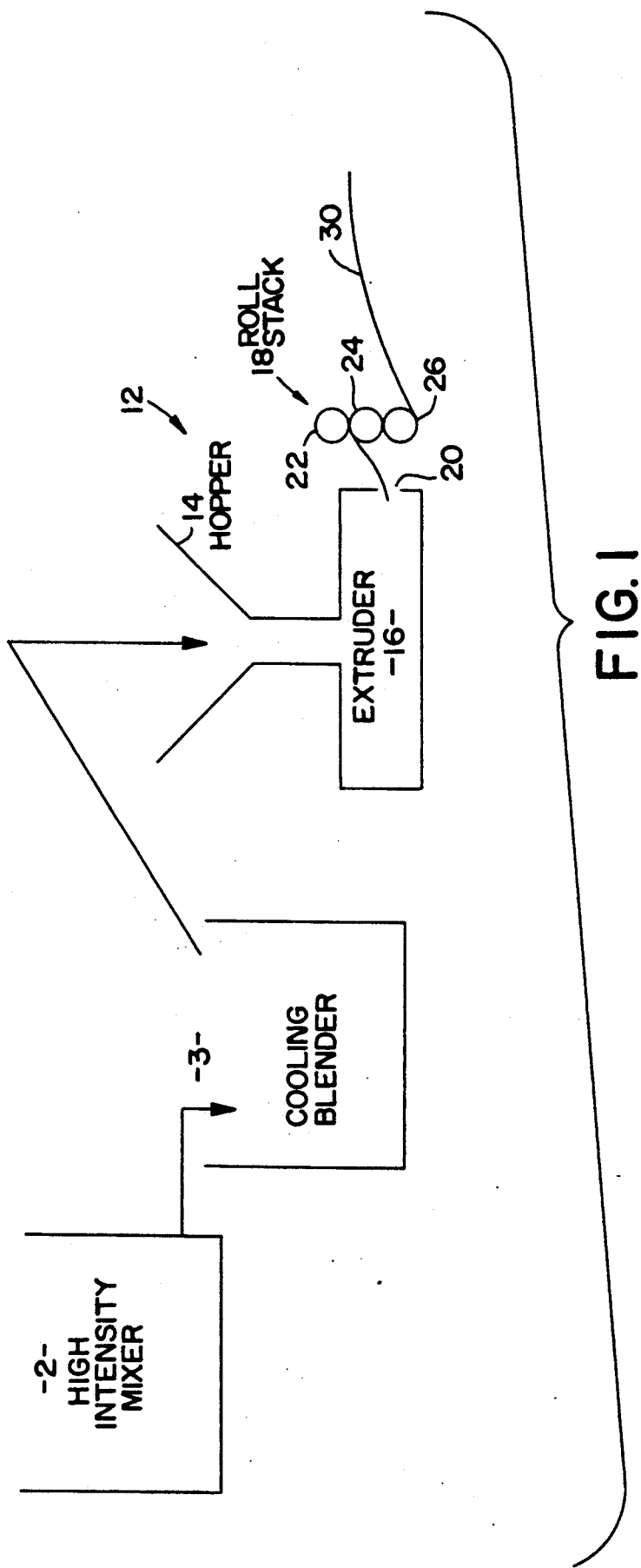
FIG. 1 is a process flow diagram illustrating the process of producing the rigid PVC.
Figure 2:
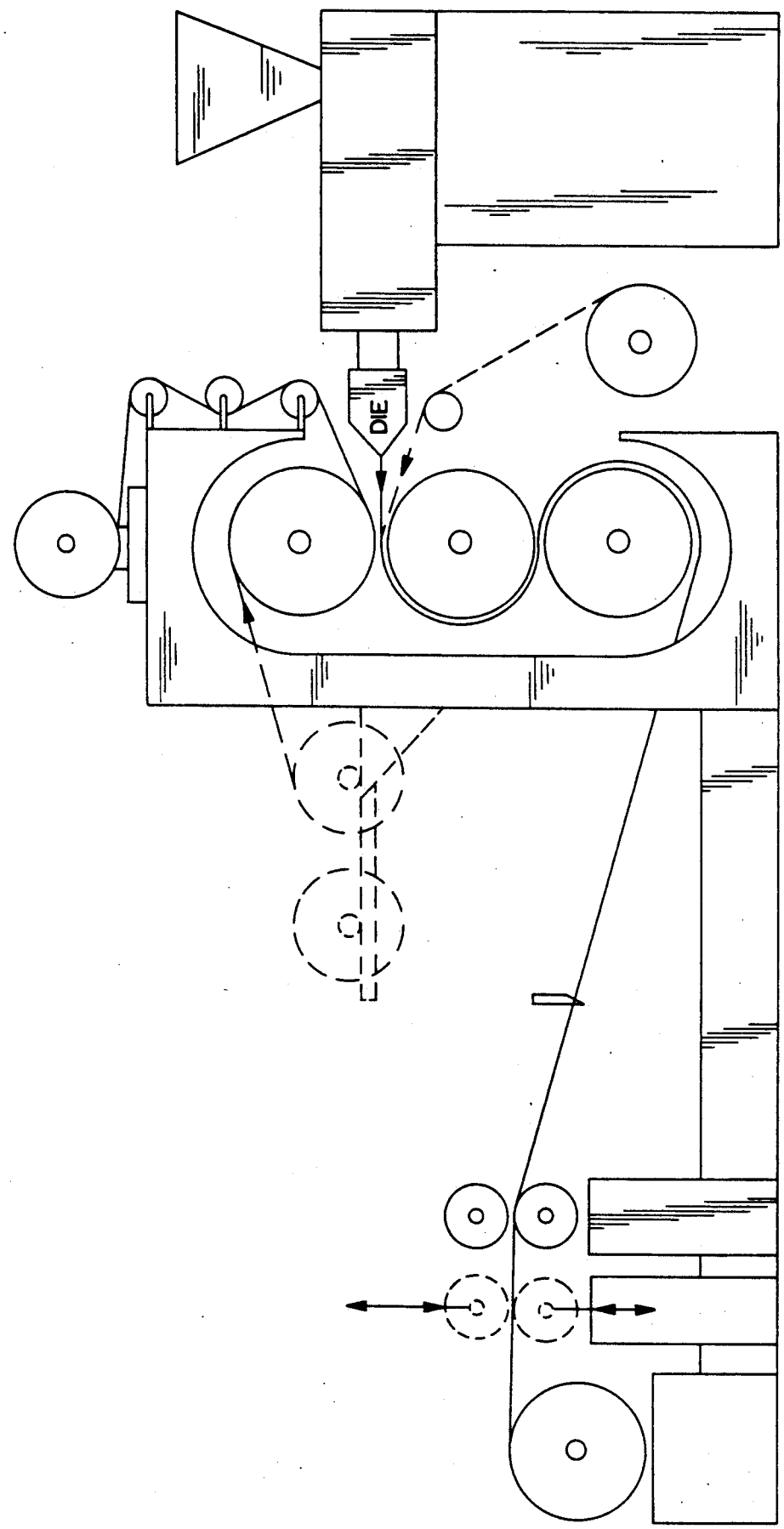
FIG. 2 is a process flow diagram illustrating the process of the present invention.
Figure 3:
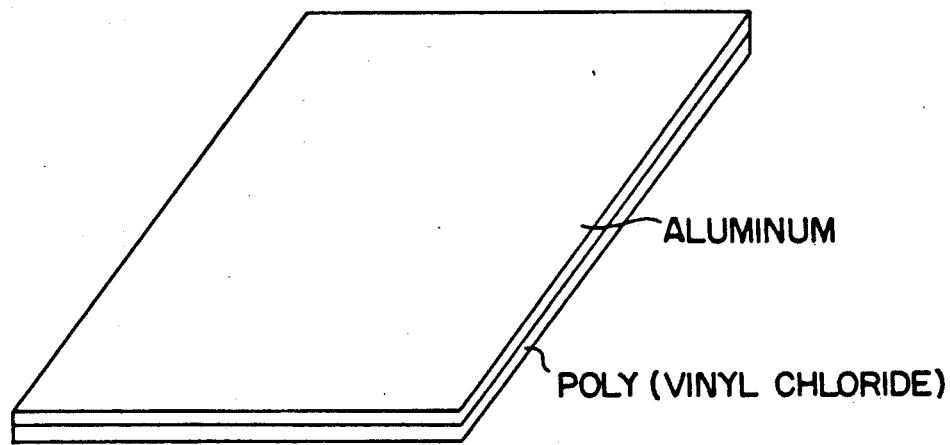
FIG. 3 is a cross section of the laminate showing the PVC layer and the layer of aluminum on one side.

The final PVC dispersion is formed into sheets in the sheet forming assembly 12 seen in FIG. 1, which is comprised of a hopper 14, extrusion assembly 16 and a three roll stack 18.

The extruder assembly 16 is arranged with the extruded die opening 20 in close adjacent relationship to the roll stack 18, e.g., 3 to 6 inches apart. Practice has shown that generally, a 20 to 30 to 1 ratio extruder with rigid PVC designed screws is what is required.

The extruder assembly 16 is set with the barrel, screw oil and die at elevated temperatures. Illustratively, the barrel temperatures are set between 335° and 350° F., the screw oil temperature is set in the range of 340° F. and the die temperature in the range of 360° to 380° F.

The process proceeds by charging the final PVC dispersion from the cooling blender, into the hopper 14, extruding the PVC material through the extruder 16 heated as previously described and out the die 20 set at a slot opening of 0.020"×44" to 54" wide. The slot dimensions provide the initial gauge and width of the vinyl sheet. The slot height can be adjusted by adjusting bolts which apply or reduce pressure to a flexible steel lip coat hanger style die.

An illustrative example of the process, procedure and resulting product of the present invention proceeds as follows:

The following materials are used with the respective parts to provide a basic standard formula of rigid PVC.

| Ingredients | Respective Parts |
| --- | --- |
| Poly(vinyl chloride) | 100.00 |

-continued

| Ingredients | Respective Parts |
| --- | --- |
| dibutyl tin bis iso octyl thioglycolate | 1.00 |
| acrylic impact modifier | 4.00 |
| acrylic processing aid | 1.50 |
| calcium stearate | 1.75 |
| parafin wax | 1.25 |
| oxidated polyethylene | .50 |

The PVC and dibutyl tin bis iso octyl thioglycolate are charged in a Henschel mixer and elevated in temperature to 165° F. The impact modifier, calcium stearate, acrylic processing and parafin wax are added to the mixer and the composite dispersion is raised in temperature to 220° F. The composition is next dropped into a cooling blender. The dispersion is cooled, resulting in a powder at 120° F.

The resulting powder is charged to the hopper 14 and extruded through the extruder at conditions wherein the extruder barrel temperature is 335° F. to 350° F., the screw oil temperature is 340° F., the die temperature is 360° F. and the material feed and screw speed are set for 60–70 amps (temperatures will vary depending on extruder used).

The extruder material leaving the die 20 is immediately rolled and bonded to the aluminum foil (by the rollers set at 120°, 160°, and 125° F.) into sheets 0.020 mils thick and 40" inches wide, or 50" wide, later slit to 36" or 48" widths.

Although various suppliers' materials can be used for the PVC, the example was conducted with GEON 85 PVC (B. F. Goodrich Co.); CC-11 Cardinal Chemical Co. dibutyl tin bis iso octyl thioglycolate; K120N Rohm & Haas acrylic processing aid; D-200 M&T impact modifier; C-Wax Cardinal Chemical Co. 165° F. parafin wax; AC 629A Allied Chemical oxidized polyethylene.

Aluminum foil is fed through idle rollers to cooling rollers for bonding to the extruded PVC sheet typically from a supply roll of coated aluminum foil. The foil is a commercial alloy 3003 as specified by The Aluminum Association rolled to a gauge of 0.010" or equivalent or less. Other aluminum grades can be used. As received from the aluminum manufacturer, the aluminum foil is coated on one side with a solvent borne coating which is a heat sealable vinyl adhesive suitable for the interface between the aluminum and whatever material the aluminum is being fused to.

There are three main cooling rollers which are stacked vertically for forming the laminate of the present invention. The rollers are simultaneously chain driven with a variable speed motor. The rollers are driven at a specific rate to pull the molten vinyl sheet from the die. This speed is critical to avoid "drawing" the vinyl from the die resulting in stress. The rolls can be 16" in diameter with a face width of 66". Other diameter and width rolls can be used.

The top roller is made of steel. It is kept at a temperature of approximately 125° F.

The middle roller is 16 inches in diameter and chrome plated for polishing the back side of the vinyl sheet. This roller is maintained at a temperature in the range of 180° F. to 200° F. This temperature range is critical for proper adhesive bonding of the aluminum and the vinyl, and may have to be adjusted for other size rolls, cooling medium temperatures available and design of the rolls.

The lower roller is 16 inches in diameter, chrome plated and maintained at a temperature of approximately 125° F.

The temperature of all of the rollers are closely monitored and controlled with individual thermocouples connected to individual controllers. Each roller is internally channeled for liquid temperature control. Maintaining the temperature of these rollers is critical to maintain the temperature of the vinyl sheet. The temperature of the vinyl sheet should be in the range of 360° F. to 380° F. out of the extruder. Above 380° F. vinyl degradation may occur.

In order to control the temperature of the rollers a two function temperature controller is employed for each roller. If heat is required, a closed loop circulating system is used which is directly heated by an immersion heater. If, on the other hand, a roller requires cooling, a controller opens a solenoid valve to circulate coolant (ethylene glycol) through the roller.

The pressure between the top of the roller and the middle roller is critical and termed the "nip" pressure. This pressure represents the force of the top roller on the vinyl sheet. This pressure is critical not only because it forms the bond between the aluminum foil and the vinyl sheet, but because it is the means to finely gauge the tolerance of the final product. The nip pressure should be in the range of 40 pli to 50 pli, (pounds per lineal inch).

As the vinyl sheet is fed between the top roller and the middle rollers, the foil is fed to the top roller in a manner to join the adhesive coated side to the top side of the vinyl sheet. The foil is pulled at the constant rate by the cooling rolls with a braking force applied to the aluminum supply package. This braking force provides constant tension across the foil roll to minimize wrinkling of the foil as it enters the roller. Idler rollers are positioned between the let off assembly and the top roller to provide a uniform tension.

As the coated foil meets the vinyl sheet at the nip, the adhesive is activated by the latent heat in the molten 360° F. vinyl web. The degree of bonding is determined by the stock temperature of the vinyl web, the cooling roll temperatures, nip pressure, and the line speed.

The aluminum-vinyl laminate travels in an S configuration from the top nip, around the center cooling rolls, through the bottom nip between the center and the bottom cooling rolls and then around the bottom cooling roll. The vinyl-aluminum web is pulled off the bottom cooling roll in a horizontal direction by two pull rolls stacked vertically and driven at the same speed as the cooling rolls. Sufficient nip pressure is applied between these two pull rolls to maintain a constant pulling force.

Between the bottom cooling roll and the pull rolls, trim knives are positioned to cut the vinyl-aluminum web to a finished width of 35.5". The continuous web then travels from the pull rolls to a winder where the web is wound to a finished package weight of approximately 350 lbs.

The following example is illustrative of the invention and is not intended to limit the invention as encompassed by the claims of the application.

The following materials are used with the respective parts to provide an example of the jacketing material of Applicants' invention.

| Ingredients | Parts per Hundred | LBS. | OZ. |
|---|---|---|---|
| GEON 85 (B. F. Goodrich) | 100.000 (Resin) | 250 | — |
| CC-11 (Cardinal Chemical) | 2.500 (Stabilized) | 6 | 4 |
| K120N (Rohm & Haas) | 3.000 (Processing Aid) | 7 | 8 |
| KM 733 (Rohm & Haas) | 10.000 (Impact Modifier) | 25 | 0 |
| Wax E (Hoechst Co.) | 1.250 (External Lubricant) | 3 | 2 |
| Wax OP (Hoechst Co.) | 0.800 (External Lubricant) | 1 | 16 |
| 83S573C (Penn Color Co.) | 0.120 (Blue Tint Color Concentrate) | 0 | 5 |
| Mineral Oil (Squib Co.) | 0.100 (Lubricant) | 0 | 4 |
| AL 26 (Argus Co.) | 1.750 (Anti-Stat) | 4 | 6 |
| Formula Weight | 117.770 | 299 LBS./Batch | |

The resulting product of jacketing material is about 0.16 pounds per square foot. It has a tensile strength of about 11,000 psi and a tensile modulus of about 140,000 psi as measured by ASTM Test No. D-638. It also has a flexural strength of about 9,000 psi and a flexural modulus of about 240,000 psi as measured by ASTM Test No. D-790. Further, the jacketing material has an impact resistance of about 2112 mt. gms. at 73° F., 2105 mt. gms. at 0° F., and 1808 mt. gms. at −40° F., as measured by ASTM Test No. D-3029. The linear thermal expansion of the jacketing material is about $13.1 \times 10^{-6}$ in./in./deg. according to ATSM Test No. D-696 and a flame/smoke resistance of 15/50 as measured by ASTM Test No. E-84. Additionally, it has been found that when a composition comprising aluminum having a thickness of about 0.003" bonded with PVC having a thickness of about 0.017, is thermally tested according to the requirements set forth in ASTM E.84, a flame spread of only 9.6 results. Further, the smoke contribution during this test is virtually zero. This result has been shown up to a temperature of approximately 1160° F.

We claim:

1. An insulating jacketing material comprising a metallic foil and a layer of a rigid poly(vinyl chloride) composition devoid of plasticizer bonded to the layer of metallic foil.

2. The material of claim 1 wherein said rigid poly(vinyl chloride) composition has a thickness in the range of 0.005" to 0.040" and said layer of metallic foil comprises aluminum foil having a thickness in the range of 0.001" to 0.010".

3. The material of claim 1 having the following properties:

| Properties | Value |
|---|---|
| Weight per sq. ft. | .16 lbs. |
| Tensile Strength | 11,000 psi |
| Tensile Mod. | 140,000 psi |
| Flexural Strength | 9,000 psi |
| Flexural Mod. | 240,000 psi |
| Impact Resistance | 2112 mt. gms. at 73° F. |
| | 2105 mt. gms. at 0° F. |
| | 1808 mt. gms. at −40° F. |
| Linear Thermal Expansion | $13.1 \times 10^{-6}$ in./in./deg. |
| Flame/Smoke | 15/50. |

4. The material of claim 1 wherein said metallic foil comprises aluminum.

5. The material of claim 1 wherein said metallic foil comprises aluminum alloys.

6. The material of claim 1 wherein said metallic foil comprises stainless steel.

7. The material of claim 1 wherein said metallic foil comprises copper foil.

8. The material of claim 1 wherein said material is formed into continuous wound rolls.

9. The material of claim 1 wherein said material is formed into cut sheets.

10. The material of claim 9 wherein said cut sheets are approximately 0.020 mils thick and about 36" to about 50" wide.

11. The material of claim 1 wherein said rigid poly(vinyl chloride) composition has a thickness in the range of 0.005" to 0.060" and said layer of metallic foil has a thickness in the range of 0.001" to 0.010".

12. The material of claim 11 wherein said rigid poly(vinyl chloride) composition has a thickness in the range of 0.005" to 0.060" and said layer of metallic foil comprises aluminum foil having a thickness in the range of 0.001" to 0.010".

13. The material of claim 11 wherein said PVC has a thickness in the range of 0.018" and said aluminum foil has a thickness in the range of 0.002".

14. The material of claims 1 or 12 wherein said material is adapted for electrical stray current shielding and can be electrically grounded.

15. The material of claims 1 or 12 wherein said material passes ASTM E-84 flame spread and smoke development (50) requirements.

16. A process of producing an insulation jacketing material having a layer of metallic foil and a layer of rigid poly(vinyl chloride) composition devoid of plasticizer bonded to the layer of metallic foil comprising the steps of:
   a) forming the PVC composition, and
   b) bonding the PVC composition to the metallic foil.

17. The process of claim 16 wherein said bonding is accomplished by using a contact type adhesive.

18. The process of claim 16 wherein said bonding is accomplished by using a hot melt adhesive.

19. The process of claim 16 wherein said jacketing material has a draw ratio in the range of 4 to 1.

20. The process of claim 16 wherein said metallic foil is aluminum foil.

21. The process of claim 16 wherein said metallic foil is aluminum alloys.

22. The process of claim 16 wherein said metallic foil is stainless steel.

23. The process of claim 16 wherein said metallic foil is copper foil.

24. The process of claim 16 wherein the jacketing material has the following properties:

| Properties | Value |
| --- | --- |
| Weight per sq. ft. | .16 lbs. |
| Tensile Strength | 11,000 psi |
| Tensile Mod. | 140,000 psi |
| Flexural Strength | 9,000 psi |
| Flexural Mod. | 240,000 psi |
| Impact Resistance | 2112 mt. gms. at 73° F. |
|  | 2105 mt. gms. at 0° F. |
|  | 1808 mt. gms. at −40° F. |
| Linear Thermal Expansion | $13.1 \times 10^{-6}$ in./in./deg. |
| Flame/Smoke | 15/50. |

25. The process of claim 16 wherein said metallic foil is aluminum foil.

26. The process of claim 25 wherein said extruded poly(vinyl chloride) is bonded to said aluminum foil by passing said extruded poly(vinyl chloride) and said aluminum foil simultaneously through said roll stack.

27. The process of claim 25 wherein said bonding includes bonding said poly(vinyl chloride) composition with 0.001" to 0.010" gauge aluminum foil having a solvent borne coating.

28. The process of claim 27 wherein said solvent borne coating comprises a vinyl resin.

29. The process of claim 25 wherein the poly(vinyl chloride) composition is formed into poly(vinyl chloride) sheets by passing extruded poly(vinyl chloride) through a roll stack having at least an upper roller, a middle roller, and a lower roller.

30. The process of claim 25 wherein the poly(vinyl chloride) composition is formed into poly(vinyl chloride) sheets by passing extruded poly(vinyl chloride) through a roll stack having at least an upper roller, and a middle roller.

31. The process of claim 29, wherein at least one of said rollers includes a corrugating roller.

32. The process of claim 29 wherein said top roller of said roll stack and said bottom roller of said roll stack are maintained at a temperature approximately 125° F. and the temperature of said middle roller of said roll stack is maintained at a temperature of about 180°-200° F.

33. The process of claims 29 or 30 wherein the rollers in contact with the plastic composition are chrome plated.

34. The process of claims 29 or 30 wherein the roller receiving the aluminum foil has a rubber coating.

35. The process of claim 34 wherein said rubber coated roller has a durometer of 40 to 80 Shore A.

* * * * *